US006408130B1

United States Patent
Elferich

(10) Patent No.: US 6,408,130 B1
(45) Date of Patent: Jun. 18, 2002

(54) ELECTRIC DRIVE SYSTEM WITH AN ELECTRONICALLY COMMUTED DC MOTOR IN ORDER TO REDUCE TORQUE IRREGULARITIES

(75) Inventor: Reinhold Elferich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/787,456

(22) PCT Filed: Jul. 17, 2000

(86) PCT No.: PCT/EP00/06809

§ 371 (c)(1),
(2), (4) Date: Mar. 19, 2001

(87) PCT Pub. No.: WO01/06633

PCT Pub. Date: Jan. 25, 2001

(30) Foreign Application Priority Data

Jul. 20, 1999 (DE) .......................................... 199 33 156

(51) Int. Cl.[7] .................................................. H02P 5/00
(52) U.S. Cl. ........................ 388/800; 318/138; 318/139; 318/254; 318/432; 318/439; 318/459; 318/448; 318/700; 318/702; 388/801; 388/802; 388/803; 388/804; 388/805; 388/806; 388/807; 388/808; 388/809; 388/810; 388/811
(58) Field of Search .............................. 318/439, 432, 318/459, 700, 138, 139, 448, 702, 254; 388/800

(56) References Cited

U.S. PATENT DOCUMENTS

| | | | | |
|---|---|---|---|---|
| 4,292,575 A | * | 9/1981 | Kuhnlein et al. | 318/254 |
| 4,546,294 A | * | 10/1985 | Ban et al. | 318/311 |
| 4,780,651 A | * | 10/1988 | Nakano et al. | 318/254 |
| 5,382,889 A | * | 1/1995 | Peters et al. | 318/254 |
| 5,600,218 A | * | 2/1997 | Holling et al. | 318/439 |
| 5,614,797 A | * | 3/1997 | Carbolante | 318/254 |
| 5,714,828 A | | 2/1998 | Ackermann et al. | 310/254 |
| 5,777,449 A | * | 7/1998 | Schlager | 318/459 |
| 5,783,917 A | * | 7/1998 | Takekawa | 319/439 |
| 5,814,957 A | * | 9/1998 | Yoshida | 318/439 |
| 6,081,087 A | * | 6/2000 | Ijima et al. | 318/439 |

FOREIGN PATENT DOCUMENTS

EP 0773624 6/1999 ............. H02P/6/10

* cited by examiner

Primary Examiner—Robert E. Nappi
Assistant Examiner—Tyrone Smith

(57) ABSTRACT

The invention relates to an electric drive device with a DC motor (2) comprising a control circuit with an electronic commutator (3). The invention is characterized in that a derivation of a control signal (V_i_ref) is obtained from an induced motor voltage (E_sample) detected by a measuring device and from a reference value (V_i_av) which serves to regulate the speed of the DC motor (2), and in that the derived control signal (V_i_ref) serves to achieve a substantially constant torque of the DC motor (2) through adjustment of the motor currents (ia, ib, ic).

Figure 1:
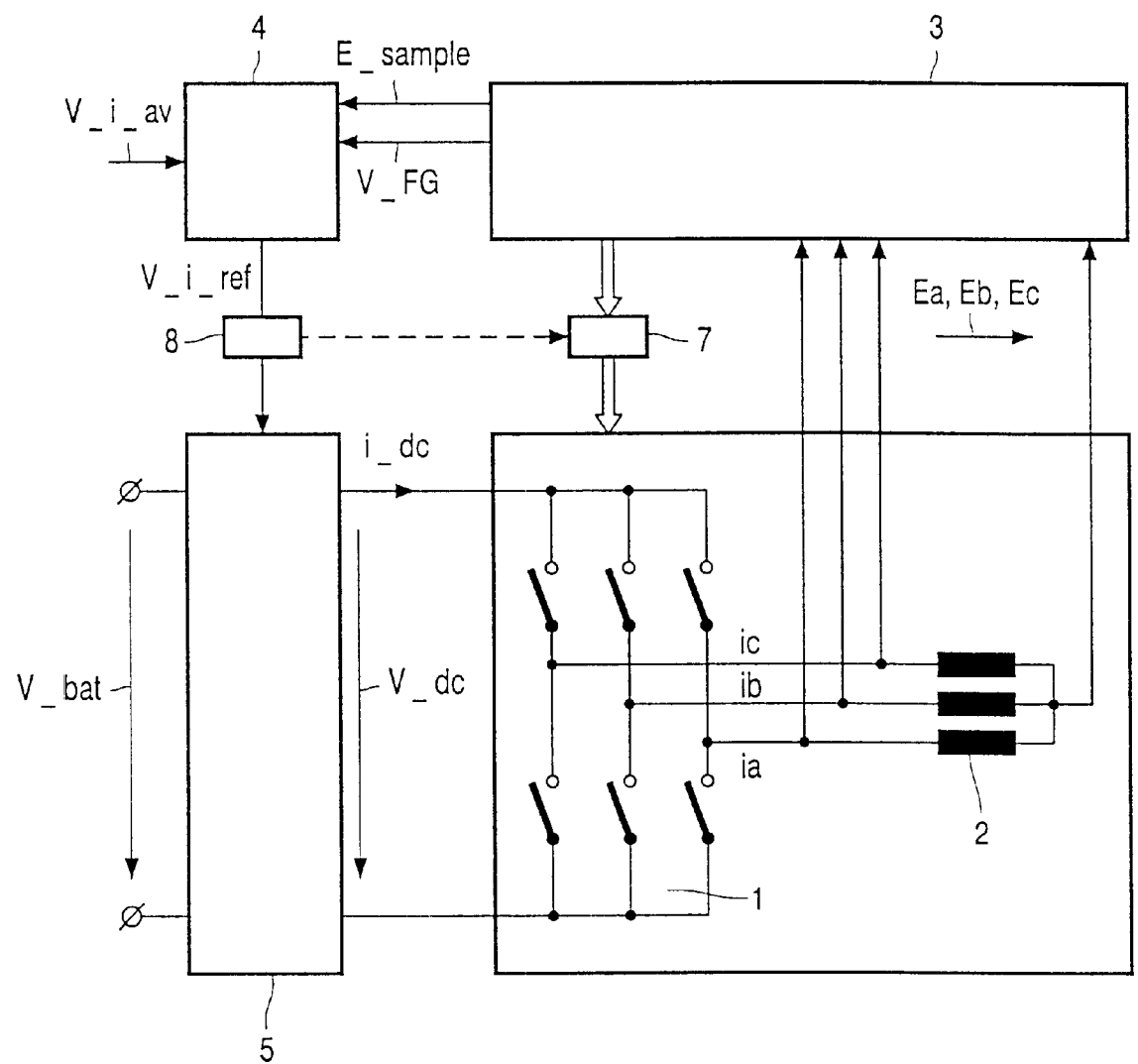

6 Claims, 4 Drawing Sheets

ELECTRIC DRIVE SYSTEM WITH AN ELECTRONICALLY COMMUTED DC MOTOR IN ORDER TO REDUCE TORQUE IRREGULARITIES

The invention relates to an electric drive device with a DC motor, in particular with a permanent-magnetically excited air core coil motor, with a control circuit comprising an electronic commutator.

Electronically commutated, permanent-magnetically excited small DC motors of low inductance, such as air core coil motors, satisfy high requirements as regards quiet running. This property becomes increasingly important for spindle drives in computer drive units, because the achievable storage densities increase. Air core coil motors are particularly suitable here, because they generate no interfering detent torques and radial forces.

Known spindle drives are fitted exclusively with slotted-core iron armature motors. There are suggestions for hard disk drives with air core coil motors (foil motors) with internal rotor as described, for example, in U.S. Pat. No. 5,714,828. A new development in the field of electronic commutation of motors for hard disk drives is "phase current shaping". Here the phase current is modulated in the three individual phases with the object of achieving a certain—for example approximately sinusoidal—gradient of the phase currents. Usually the motor voltage is pulse width modulated (PWM) in this case, because otherwise the switching losses would be very high. The PWM duty cycle serves as the manipulated variable. This method as a rule requires a PLL-supported commutation control on account of the more difficult zero passage recognition of the induced voltage. Furthermore, such a phase current shaping cannot be transferred to air core coil motors (for example with foil windings) without modifications. These motors indeed have considerably smaller electric time constants compared with the iron armature types (i.e. approximately one tenth) and require a correspondingly higher pulse frequency of the PWM, which in its turn can be realized with additional expenditure only.

EP 0773624 discloses another method of reducing the torque ripple through modification of the current in the intermediate circuit only, while retaining the conventional 120° square wave commutation, preferably by sensorless commutation (EMF commutation). Here the motor voltage is raised after each commutation moment in order to achieve a somewhat more even intermediate circuit current and in addition to avoid torque glitches after switching caused by the operation and the inductance. The signal for this is obtained from the discharging process of an RC member. The torque ripple can indeed be reduced in this manner, but only to a certain degree, because it is to be observed that the product of current and flux linking change is to be kept constant at all times. This, however, requires a continuous adaptation of the current. This method is not very suitable for motors with a very small electric time constant.

It is an object of the invention to reduce commutation-dependent torque fluctuations of permanent-magnetically excited motors with air core coils.

According to the invention, this object is achieved in that a derivation of a control signal is obtained from an induced motor voltage detected by a measuring device and from a reference value which serves to regulate the speed of the DC motor, and in that the derived control signal serves to achieve a substantially constant torque of the DC motor through adjustment of the motor currents (ia, ib, ic). This motor control reduces the commutation-dependent torque ripple of low-inductance small DC motors. For this purpose, the 120° square wave commutation with zero passage detection is retained, and the intermediate circuit current only is modulated, so that a modulation of the single phase currents is omitted and a conventional commutation method, such as sensorless commutation (EMF commutation) can be used. The signal necessary for this is obtained in a simple manner from the induced voltage. The circuitry expenditure is clearly reduced in comparison with other methods thereby.

The embodiment as claimed in claim 2 renders possible a simple determination of the reference value for the motor current at which the motor torque is constant. The embodiment of claim 3 renders possible a determination of the reference value for the motor current at which the motor torque is constant, also if the motor speed is not constant.

The embodiment of claim 4 renders possible a simple adjustment of the intermediate circuit current by means of a longitudinal control and a control member, using the control signal.

In the embodiment of claim 5, the control member may be omitted in that an inverter belonging to the commutator is directly controlled by the control unit.

Figure 2:
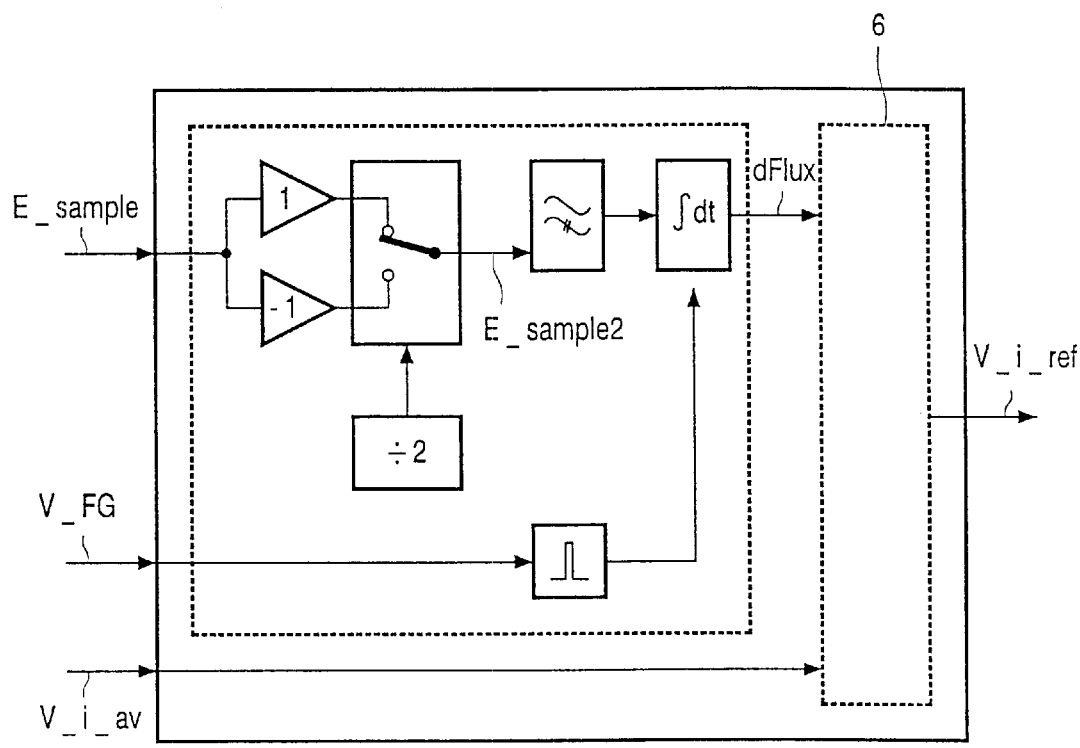
Figure 3A:
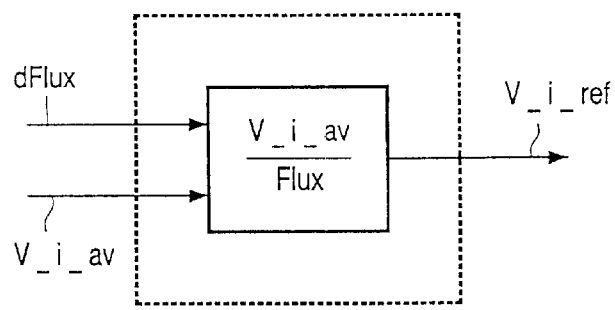

The invention will be explained in more detail below with reference to a number of Figures, in which FIG. 1 is a block diagram showing the circuit of an electric drive device according to the invention, FIG. 2 shows the arrangement of the reference value determination for the motor current in block 4 in more detail, FIG. 3a shows the principle and FIG. 3b a practical implementation of the signal processing which takes place in block 6, and FIGS. 4a to 4h show a number of signal gradients in the motor control.

The block diagram of FIG. 1 shows the entire drive comprising an inverter 1, a DC motor 2, an EMF commutator 3, and a block 4 for obtaining the reference signal and a block 5 which converts this reference value for the intermediate circuit current by means of an adjustment step. The EMF commutator 3 operates with 120° phase shifts in the square wave mode and with zero passage detection, the abbreviation EMF (electro-motive-force) denoting a sensorless commutation, which measures the induced motor voltage in the respective currentless states of the three phases Ea, Eb, Ec. The exclusive use of an EMF commutator 3, however, leads to problems with the torque ripple in the case of motors 2 of low inductance, in particular air core coil motors, which is why a block 4 with a novel circuit is added.

FIG. 2 shows the construction of the block 4 for forming the reference value in detail. Its input quantities are on the one hand the commutation signal V_FG, pictured in FIG. 4b, the measured induced voltage E_sample, shown in FIG. 4a, where φ denotes the electrical angle of rotation of the motor 2. These two quantities are supplied by the EMF commutator. Furthermore, a control signal V_i_av is applied by a control circuit (not shown), by means of which the speed of rotation of the motor 2 can be set.

Figure 4A:
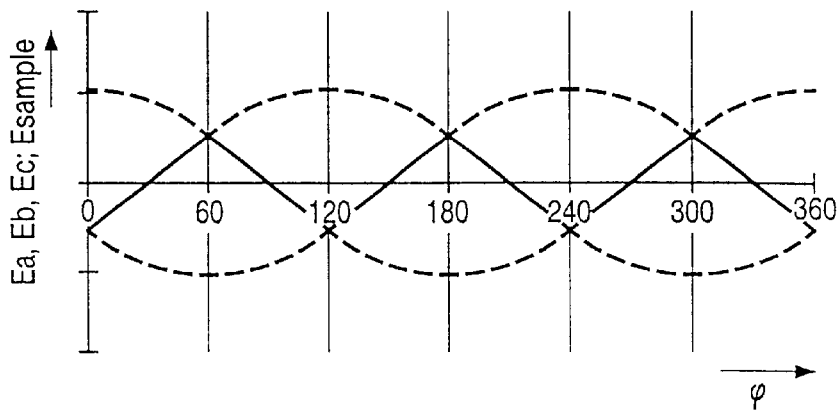
Figure 4B:
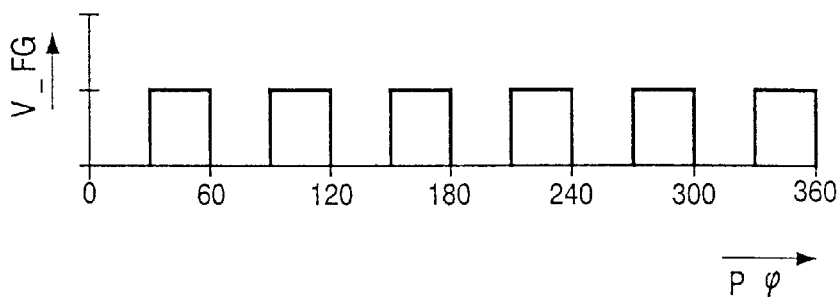
Figure 4C:
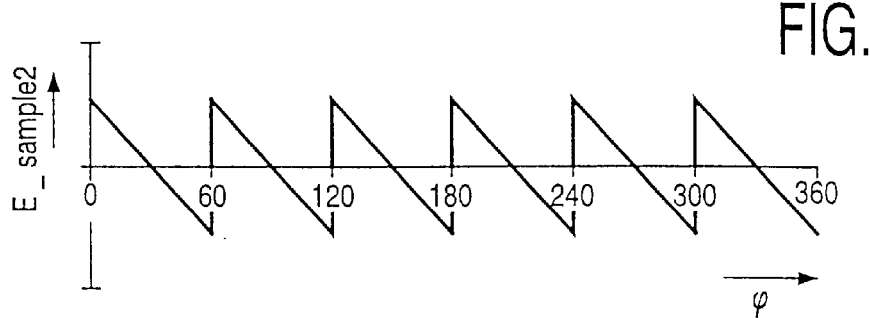
Figure 4D:
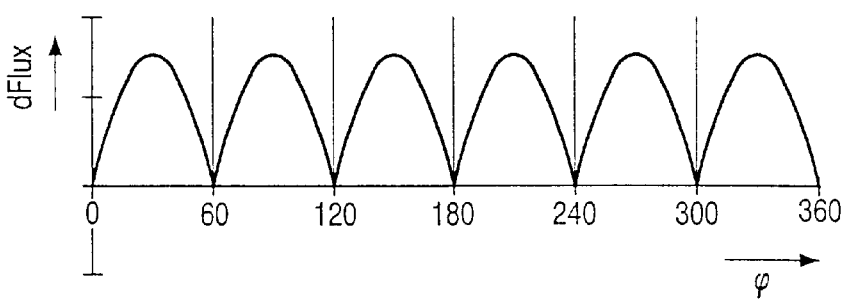

The signal V_i_av is the reference value for the motor current value averaged in time generated in a higher order speed control. Since the two signals V_FG and E_sample are available in the EMF commutator 3 anyway, only one new, additional block 4 is necessary for minimizing the torque ripple of the motor 2. The reference value for the instantaneous motor current is obtained in block 4, as shown in FIG. 2, in that first E_sample is inverted in each second commutation cycle, and the signal E_sample2 thus generated is integrated, which leads to the signal dFlux. A filter may be connected between the inversion step and the integration step, as shown in FIG. 2, so as to filter out any DC component which may be present from the signal E_sample2. The gradient of dFlux is shown in FIG. 4d. The signal dFlux is then passed on to block 6, whose operation will be explained below.

Figure 4E:
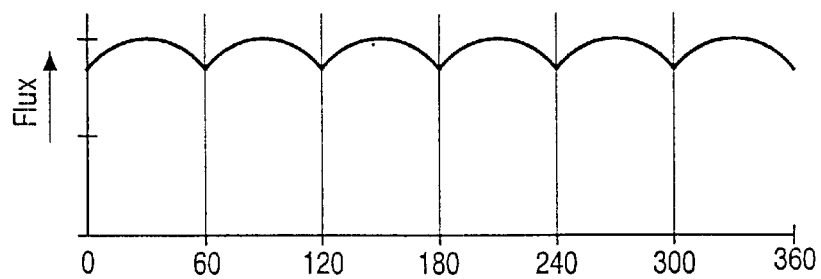
Figure 4F:
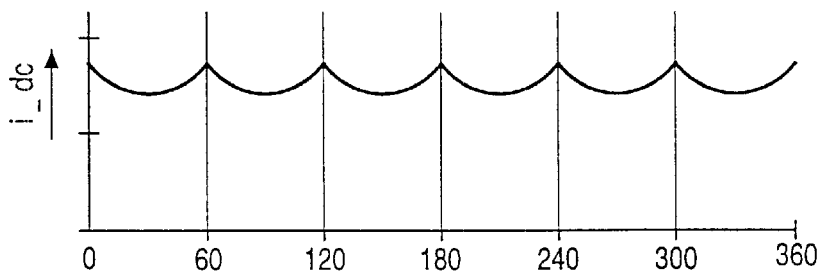
Figure 4G:
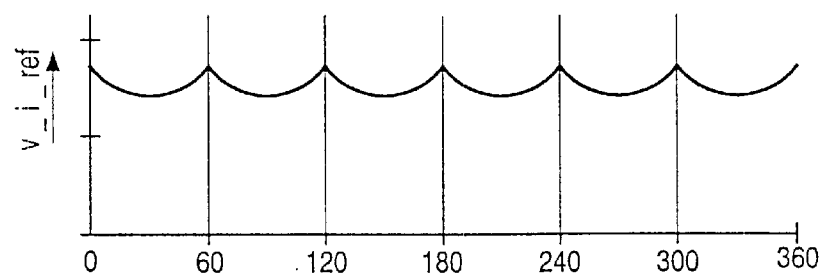

The reference value V_i_ref for the instantaneous value of the motor current, which achieves a constant motor torque, can be obtained from the signal dFlux by means of the relation indicated in FIG. 3a. The signal Flux of FIG. 4e is obtained by means of the relation 1+c1*dFlux. A standardizing factor c1 is set for this purpose such that a ratio of the maximum value to the minimum value of the signal Flux results which corresponds to the ratio of the maximum value to the minimum value of the rectified induced voltage. In the case of an ideal three-phase motor, this ratio is equal to the factor $2/\sqrt{3}$.

Figure 3B:
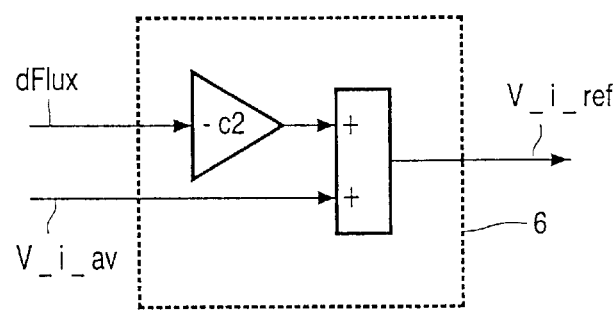

In practice, the relation of FIG. 3 can be approximately evaluated in a very simple manner with a circuit 6 as shown in FIG. 3b in that the signal dFlux, after being amplified by a constant factor c2 which is to be set, is subtracted from the reference signal for the instantaneous average value of the motor current V_i_av, which reference signal is to be regarded as constant here. This functions highly satisfactorily for motors 2 which have to cover only a narrow range of speeds such as, for example, drives for hard disk units which operate at a constant speed, because the reference signal V_i_av is constant here because of the constant speed of rotation, as is the factor c. The signal V_i_ref thus created is pictured in FIG. 4g. The factor c1 must be adapted to the instantaneous speed of rotation in the case of a drive with variable speed, which is possible, however, by means of an arithmetic unit with the use of the speed-dependent signal V_FG.

The algorithm described in FIGS. 2 and 3 may be realized by means of analog or digital signal processing units.

The signal V_i_ref is the controlling quantity for the current i_dc of an intermediate circuit control 8 which can be adjusted by means of a comparison between a target value and an actual value with a subsequent control operation by a control member 5. This may be achieved, for example, by means of a longitudinal control 8. Then the intermediate circuit current i_dc is commutated to the three phases by the inverter 1.

Figure 4H:
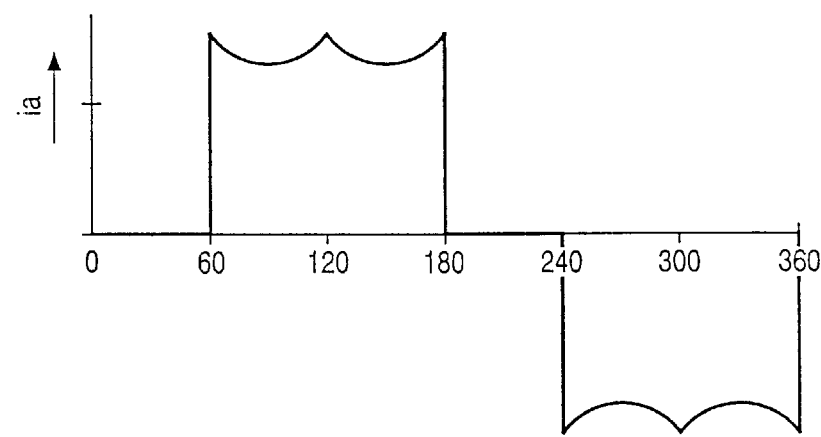

Alternatively, the output of the control 8 may be utilized as a controlling quantity for a joint adjustment operation for the inverter transistors 1, which is shown with a broken line in FIG. 1. In this case, the supply voltage v_bat and the intermediate circuit voltage v_dc are identical, because the control member 5 is absent in this embodiment. The control of the inverter 1, on the other hand, is more complicated here, because it carries out not only the commutation, but also has to control the torque ripple, for which a coordination of the two processes in one electronic circuit 7 is necessary. FIG. 4h shows by way of example the motor current ia in a phase Ea at a minimum torque ripple, while the other motor currents have respective phase shifts of 120°.

What is claimed is:

1. An electric drive device with a DC motor with a control circuit comprising an electronic commutator, wherein a derivation of a control signal is obtained from an induced motor voltage detected by a measuring device and from a reference value which serves to regulate the speed of the DC motor, and wherein the derived control signal serves to achieve a substantially constant torque of the DC motor through adjustment of the motor currents, and wherein an inversion of the measured induced voltage of the commutator is provided in every second commutation cycle, followed by an integration and a derivation therefrom of a signal, which after amplification and subsequent subtraction from the reference value is available as a control signal.

2. An electric drive device with a DC motor with a control circuit comprising an electronic commutator, wherein a derivation of a control signal is obtained from an induced motor voltage detected by a measuring device and from a reference value which serves to regulate the speed of the DC motor, and wherein the derived control signal serves to achieve a substantially constant torque of the DC motor through adjustment of the motor currents and wherein an inversion of the measured induced voltage of the commutator is provided in every second commutation cycle, followed by an integration and a derivation therefrom of a signal, which multiplied by a factor and after addition of 1 yields a signal by which the reference value is divided, in that the control signal being the result of said division is available, and in that it is provided that the factor is applied by means of an arithmetic unit such that the ratio of the minimum value to the maximum value of the signal corresponds to the ratio of the minimum value to the maximum value of the rectified induced voltage.

3. An electric drive device as claimed in claim 1, characterized in that the derived control signal is provided for triggering a controller, and said controller is provided for controlling an intermediate circuit current by means of a control member.

4. An electric drive device as claimed in claim 1, characterized in that the derived control signal is provided for triggering a controller which carries out a control operation on the inverter belonging to the commutator.

5. An electric drive device as claimed in claim 2, characterized in that the derived control signal is provided for triggering a controller, and said controller is provided for controlling an intermediate circuit current by means of a control member.

6. An electric drive device as claimed in claim 2, characterized in that the derived control signal is provided for triggering a controller which carries out a control operation on the inverter belonging to the commutator.

* * * * *